(12) United States Patent
Wang et al.

(10) Patent No.: US 11,822,026 B2
(45) Date of Patent: Nov. 21, 2023

(54) DETECTION STRUCTURE FOR FAST NEUTRONS AND METHOD FOR ACQUIRING NEUTRON ENERGY SPECTRUM

(71) Applicant: SHANDONG UNIVERSITY, Weihai (CN)

(72) Inventors: Shuo Wang, Weihai (CN); Chenyao Han, Weihai (CN); Quanqi Shi, Weihai (CN); Xiaoli Wang, Weihai (CN); Pengzhi He, Weihai (CN)

(73) Assignee: SHANDONG UNIVERSITY, Weihai (CN)

( * ) Notice: Subject to any disclaimer, the term of this patent is extended or adjusted under 35 U.S.C. 154(b) by 0 days.

(21) Appl. No.: 18/107,491

(22) Filed: Feb. 8, 2023

(65) Prior Publication Data

US 2023/0184968 A1 Jun. 15, 2023

Related U.S. Application Data

(63) Continuation of application No. PCT/CN2022/100035, filed on Jun. 21, 2022.

(30) Foreign Application Priority Data

Nov. 22, 2021 (CN) .......................... 202111381995.7

(51) Int. Cl.
*G01T 3/00* (2006.01)
*G01T 3/08* (2006.01)

(52) U.S. Cl.
CPC .............. *G01T 3/003* (2013.01); *G01T 3/085* (2013.01)

(58) Field of Classification Search
CPC ........... G01T 3/003; G01T 3/085; G01T 1/29; G01T 3/00; G01V 5/00
See application file for complete search history.

(56) References Cited

U.S. PATENT DOCUMENTS 10,191,160 B1 * 1/2019 Newman .............. G01V 5/0008
2004/0061047 A1 4/2004 Bolozdynya
(Continued)

FOREIGN PATENT DOCUMENTS

CN 103842851 A 6/2014
CN 109143314 A 1/2019
(Continued)

OTHER PUBLICATIONS

International Search Report of PCT/CN2022/100035.
(Continued)

*Primary Examiner* — David P Porta
*Assistant Examiner* — Mamadou Faye
(74) *Attorney, Agent, or Firm* — J.C. PATENTS (57) ABSTRACT

The present application relates to a detection structure for fast neutrons and a method for acquiring a neutron energy spectrum, the detection structure for fast neutrons comprises seven semiconductor detection units and a conversion layer made of a hydrogen-containing material, the seven semiconductor detection units comprise a first, a second, a third, a fourth, a fifth, a sixth and a seventh semiconductor detection unit arranged sequentially, the first, the fourth and the seventh semiconductor detection unit constitute an anti-coincidence detection group, the second and the third semiconductor detection unit constitute a neutral particle background detection group, the fifth and the sixth semiconductor detection unit constitute a recoil proton detection group, the conversion layer is disposed between the fourth and the fifth semiconductor detection unit, incident neutrons collision with hydrogen atomic nuclei and generate the recoil protons. The present application can effectively reduce influence of background signals on the measurement and improve accuracy of the inversed neutron energy spectrum.

10 Claims, 6 Drawing Sheets

(56) References Cited

U.S. PATENT DOCUMENTS

2005/0205798 A1* 9/2005 Downing ............... G01T 3/008
 250/390.11
2012/0145913 A1 6/2012 Feller

FOREIGN PATENT DOCUMENTS

| CN | 209102917 U | 7/2019 |
|---|---|---|
| CN | 113126141 A | 7/2021 |
| CN | 113820737 A | 12/2021 |
| CN | 114063141 A | 2/2022 |

OTHER PUBLICATIONS

NPL1: "Geant4 Developments and Applications", IEEE Transactions on Nuclear Science, vol. 53, No. 1, Feb. 2006, pp. 270-278.
NPL2: "Geant4—a simulation toolkit", Nuclear Instruments and Methods in Physics Research A 506 (2003) 250-303.
NPL3: "Evaluation of the neutron radiation environment inside the International Space Station based on the Bonner Bal Neutron Detector experiment", Radiation Measurements 42 (2007) 1510-1520.
NPL4: "Badhwar—O'Neill 2014 Galactic Cosmic Ray Flux Model Description", NASA/TP-2015-218569.

* cited by examiner

DETECTION STRUCTURE FOR FAST NEUTRONS AND METHOD FOR ACQUIRING NEUTRON ENERGY SPECTRUM

CROSS-REFERENCE TO RELATED APPLICATIONS

The present application is a continuation of the international application PCT/CN2022/100035 filed on Jun. 21, 2022, which claims the priority of the Chinese patent application No. 202111381995.7 filed on Nov. 22, 2021 to the China National Intellectual Property Administration, titled "Compact Anticoincidence Detection Structure for fast neutrons and Method for Acquiring Neutron Energy Spectrum", the above identified applications are incorporated herein in its entirety by reference.

TECHNICAL FIELD

The present application belongs to the technical field of neutron detection, in particular relates to a detection structure for fast neutrons and a method for acquiring a neutron energy spectrum.

BACKGROUND ART

The radiation environment in interplanetary space is extremely complex, containing galactic cosmic rays, solar energetic particles and a variety of secondary particles produced by the interaction of these primary particles and substances. As neutrons are electrically neutral, problems about efficiency and accuracy of neutron detection have always been hotspots of researches. Reducing the background from other neutral and charged particles during the measurement is included in the problem about the accuracy of neutron detection.

The recoil proton method is a common method to detect fast neutrons, by which fast neutrons are indirectly detected by detecting recoil protons generated by the collision between the fast neutrons and hydrogen atomic nuclei in a hydrogen-containing material, then, the energy spectrum of neutrons is acquired by inversing the energy spectrum of the detected recoil protons. However, gamma rays and charged particles from the background can also deposit energy in the detection system, which will influence the accuracy of the energy spectrum of recoil protons and will result in large errors in the inversed neutron energy spectrum.

SUMMARY

For solving the problem of low accuracy of the inversed neutron energy spectrum in the prior art, the present application provides a detection structure for fast neutrons and a method for acquiring a neutron energy spectrum.

For achieving the above-mentioned purposes, a first aspect of the present application provides a detection structure for fast neutrons, comprising:

seven semiconductor detection units which are arranged sequentially as a first semiconductor detection unit, a second semiconductor detection unit, a third semiconductor detection unit, a fourth semiconductor detection unit, a fifth semiconductor detection unit, a sixth semiconductor detection unit and a seventh semiconductor detection unit, each semiconductor detection unit comprises at least one semiconductor detector; the first semiconductor detection unit, the fourth semiconductor detection unit and the seventh semiconductor detection unit constitute an anticoincidence detection group which is used to delete charged particle signals incident within a solid angle range covered by the anticoincidence detection group; the second semiconductor detection unit and the third semiconductor detection unit constitute a neutral particle background detection group which is used to measure an energy spectrum of neutral particle background generated in semiconductor detectors by neutral particles, wherein the neutral particles comprise neutrons and gamma rays;

the fifth semiconductor detection unit and the sixth semiconductor detection unit constitute a recoil proton detection group which is used to measure a deposition energy spectrum generated in the semiconductor detectors by recoil protons; and a conversion layer made of a hydrogen-containing material is disposed between the fourth semiconductor detection unit and the fifth semiconductor detection unit, incident fast neutrons collision with hydrogen atomic nuclei in the conversion layer and generate the recoil protons, then the recoil protons pass through the fifth semiconductor detection unit and the sixth semiconductor detection unit to obtain the deposition energy spectrum.

In some embodiments of the present application, the first semiconductor detection unit, the fourth semiconductor detection unit and the seventh semiconductor detection unit constitute a first detection group, the second semiconductor detection unit and the sixth semiconductor detection unit constitute a second detection group, the third semiconductor detection unit and the fifth semiconductor detection unit constitute a third detection group, and an area of each semiconductor detection unit in the first detection group is larger than an area of each semiconductor detection unit in the second detection group and the third detection group.

In some embodiments of the present application, the first semiconductor detection unit, the fourth semiconductor detection unit and the seventh semiconductor detection unit in the first detection group have the same area and thickness.

In some embodiments of the present application, the second semiconductor detection unit and the sixth semiconductor detection unit in the second detection group have the same area and thickness.

In some embodiments of the present application, the third semiconductor detection unit and the fifth semiconductor detection unit in the third detection group have the same area and thickness.

In some embodiments of the present application, ring detection units comprise a first ring detection unit, a second ring detection unit, a third ring detection unit and a fourth ring detection unit which are respectively disposed around the second semiconductor detection unit, the third semiconductor detection unit, the fifth semiconductor detection unit and the sixth semiconductor detection unit, each ring detection unit comprises at least one semiconductor detector, an inner edge of the first ring detection unit disposed around the second semiconductor detection unit is adjacent to an edge of the second semiconductor detection unit, an inner edge of the second ring detection unit disposed around the third semiconductor detection unit is adjacent to an edge of the third semiconductor detection unit, an inner edge of the third ring detection unit disposed around the fifth semiconductor detection unit is adjacent to an edge of the fifth semiconductor detection unit, and an inner edge of the fourth ring detection unit disposed around the sixth semiconductor detection unit is adjacent to an edge of the sixth semiconductor detection unit.

In some embodiments of the present application, the seven semiconductor detection units and the conversion layer are disposed to be coaxial and parallel to each other.

A second aspect of the present application provides a method for acquiring a neutron energy spectrum, adopting the detection structure for fast neutrons mentioned above, which comprises the following steps:

placing the detection structure for fast neutrons in an isotropic radiation environment, and deleting signals of incident charged particles within a solid angle range covered by the first semiconductor detection unit, the fourth semiconductor detection unit and the seventh semiconductor detection unit by an anticoincidence method;

after processing data by the anticoincidence method, when the second semiconductor detection unit and the third semiconductor detection unit have signals at the same time, obtaining a first energy spectrum which is a sum of energy spectra of neutral particle background detected by the second semiconductor detection unit and the third semiconductor detection unit;

after processing data by the anticoincidence method, when the second semiconductor detection unit does not have a signal and the third semiconductor detection unit has a signal at the same time, obtaining a second energy spectrum which is an energy spectrum of neutral particle background detected by the third semiconductor detection unit;

after processing data by the anticoincidence method, when the fifth semiconductor detection unit and the sixth semiconductor detection unit have signals at the same time, obtaining a third energy spectrum which is a sum of deposition energy spectra detected by the fifth semiconductor detection unit and the sixth semiconductor detection unit, wherein the third energy spectrum comprises energy spectra of recoil protons and neutral particle background detected by the fifth semiconductor detection unit and the sixth semiconductor detection unit;

after processing data by the anticoincidence method, when the fifth semiconductor detection unit has a signal and the sixth semiconductor detection unit does not have a signal at the same time, obtaining a fourth energy spectrum which is a deposition energy spectrum detected by the fifth semiconductor detection unit, wherein the fourth energy spectrum comprises energy spectra of recoil protons and neutral particle background detected by the fifth semiconductor detection unit;

subtracting the first energy spectrum from the third energy spectrum to obtain a first recoil proton energy spectrum;

subtracting the second energy spectrum from the fourth energy spectrum to obtain a second recoil proton energy spectrum; and inversing the first recoil proton energy spectrum to obtain a first neutron energy spectrum and inversing the second recoil proton energy spectrum to obtain a second neutron energy spectrum, and combining the first neutron energy spectrum and the second neutron energy spectrum to obtain a total neutron energy spectrum which is required to be acquired.

In some embodiments of the present application, the anticoincidence method means that if the first semiconductor detection unit or the fourth semiconductor detection unit has a signal at a moment when data in the second semiconductor detection unit and the third semiconductor detection unit is processed, then the data in the second semiconductor detection unit and the third semiconductor detection unit at the moment is deleted; and if the fourth semiconductor detection unit or the seventh semiconductor detection unit has a signal at a moment when data in the fifth semiconductor detection unit and the sixth semiconductor detection unit is processed, then the data in the fifth semiconductor detection unit and the sixth semiconductor detection unit at the moment is deleted.

In some embodiments of the present application, in the detection structure for fast neutrons, ring detection units comprise a first ring detection unit, a second ring detection unit, a third ring detection unit and a fourth ring detection unit which are respectively disposed around the second semiconductor detection unit, the third semiconductor detection unit, the fifth semiconductor detection unit and the sixth semiconductor detection unit, each ring detection unit comprises at least one semiconductor detector, an inner edge of the first ring detection unit disposed around the second semiconductor detection unit is adjacent to an edge of the second semiconductor detection unit, an inner edge of the second ring detection unit disposed around the third semiconductor detection unit is adjacent to an edge of the third semiconductor detection unit, an inner edge of the third ring detection unit disposed around the fifth semiconductor detection unit is adjacent to an edge of the fifth semiconductor detection unit, and an inner edge of the fourth ring detection unit disposed around the sixth semiconductor detection unit is adjacent to an edge of the sixth semiconductor detection unit;

wherein the anticoincidence method means that if the first semiconductor detection unit or the fourth semiconductor detection unit or the first ring detection unit disposed around the second semiconductor detection unit has a signal at a moment when data in the second semiconductor detection unit is processed, then the data in the second semiconductor detection unit at the moment is deleted; if the first semiconductor detection unit or the fourth semiconductor detection unit or the second ring detection unit disposed around the third semiconductor detection unit has a signal at a moment when data in the third semiconductor detection unit is processed, then the data in the third semiconductor detection unit at the moment is deleted; if the fourth semiconductor detection unit or the seventh semiconductor detection unit or the third ring detection unit disposed around the fifth semiconductor detection unit has a signal at a moment when data in the fifth semiconductor detection unit is processed, then the data in the fifth semiconductor detection unit at the moment is deleted; and if the fourth semiconductor detection unit or the seventh semiconductor detection unit or the fourth ring detection unit disposed around the sixth semiconductor detection unit has a signal at a moment when data in the sixth semiconductor detection unit is processed, then the data in the sixth semiconductor detection unit at the moment is deleted.

Compared with the prior art, the present application has the advantages and positive effects that:
(1) the detection structure for fast neutrons provided in the embodiments of the present application can effectively reduce influences from background signals, thus the acquired energy spectrum of recoil protons is more accurate and the accuracy and reliability of the inversed energy spectrum of neutrons are much improved by the reasonable structure design;

(2) the detection structure for fast neutrons provided in the embodiments of the present application is very compact in structure and small in space occupation. It can be applied in a miniaturized device with low power consumption; and (3) by using the method for acquiring the energy spectrum of neutrons in the embodiments of the present application, influences from background signals can be effectively reduced, the energy spectrum of recoil protons generated by fast neutrons can be accurately extracted, and the accuracy of the inversed energy spectrum of neutrons can be improved.

In the drawings: 1—first semiconductor detection unit, 2—second semiconductor detection unit, 2H—first ring detection unit disposed around second semiconductor detection unit, 3—third semiconductor detection unit, 3H—second ring detection unit disposed around third semiconductor detection unit, 4—fourth semiconductor detection unit, 5—fifth semiconductor detection unit, 5H—third ring detection unit disposed around fifth semiconductor detection unit, 6—sixth semiconductor detection unit, 6H—fourth ring detection unit disposed around sixth semiconductor detection unit, 7—seventh semiconductor detection unit, and 8—conversion layer.

DETAILED DESCRIPTION OF THE EMBODIMENTS

Below, the present application will be specifically described in exemplary implementations. However, it should be understood that an element, structure and feature in an implementation can also be beneficially combined into other implementations without further description.

It is worth understanding that the specific order of steps of a method may be shown in the present application, but the order of the steps may also be different from the described order. Furthermore, two or more steps can be performed at the same time or partially performed at the same time. All such variations fall within the scope of the present disclosure.

In the description of the present application, it should be noted that the terms "first", "second", "third ", "fourth", "fifth", "sixth" and "seventh" are for descriptive purposes only, and cannot be understood as indicating or implying the relative importance.

In the description of the present application, it should be noted that an area of a semiconductor detection unit refers to an effective area and specifically refers to an area, which can detect a particle signal, on a surface of the semiconductor detector. An area of a conversion layer refers to an area of a surface opposite to the semiconductor detector, i.e. an area where nuclear reaction with incident fast neutrons may occur to generate recoil protons.

Figure 1:
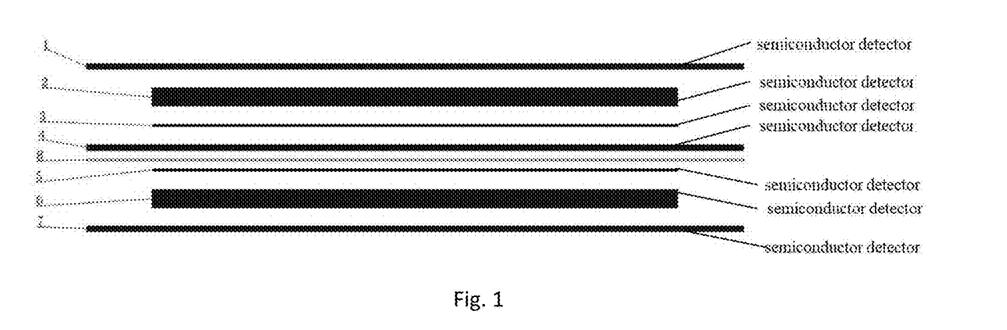
FIG. 1 is a schematic structural diagram showing a detection structure for fast neutrons provided in an embodiment of the present application.

With reference to FIG. 1, an embodiment of the present application provides a detection structure for fast neutrons, comprising:

seven semiconductor detection units which are arranged sequentially as a first semiconductor detection unit 1, a second semiconductor detection unit 2, a third semiconductor detection unit 3, a fourth semiconductor detection unit 4, a fifth semiconductor detection unit a sixth semiconductor detection unit 6 and a seventh semiconductor detection unit 7, each semiconductor detection unit comprises at least one semiconductor detector; the first semiconductor detection unit 1, the fourth semiconductor detection unit 4 and the seventh semiconductor detection unit 7 constitute an anticoincidence detection group which is used to delete charged particle signals incident within a 95% solid angle range; the second semiconductor detection unit 2 and the third semiconductor detection unit 3 constitute a neutral particle background detection group which is used to measure an energy spectrum of neutral particle background generated in semiconductor detectors by neutral particles, wherein the neutral particles comprise neutrons and gamma rays; the fifth semiconductor detection unit 5 and the sixth semiconductor detection unit 6 constitute a recoil proton detection group which is used to measure a deposition energy spectrum generated in the semiconductor detectors by recoil protons; and a conversion layer 8 made of a hydrogen-containing material is disposed between the fourth semiconductor detection unit 4 and the fifth semiconductor detection unit 5, incident fast neutrons occur a nuclear reaction with hydrogen atomic nuclei in the conversion layer and generate the recoil protons, then the recoil protons pass through the fifth semiconductor detection unit 5 and the sixth semiconductor detection unit 6 to obtain the deposition energy spectrum. The conversion layer 8 can select a hydrogen-containing thin film.

It can be understood that the deposition energy spectrum directly measured by the fifth semiconductor detection unit 5 and the sixth semiconductor detection unit 6 comprises an energy spectrum of recoil protons (i.e. the deposition energy spectrum generated in the semiconductor detectors by the recoil protons) and the energy spectrum of neutral particle background, and the energy spectrum of neutral particle background is subtracted from the measured deposition energy spectrum to obtain the energy spectrum of recoil protons.

Furthermore, during detection, it can be understood that, at the same time, there may also be recoil protons pass through the second semiconductor detection unit 2, the third semiconductor detection unit 3 or the fourth semiconductor detection unit 4, but they are all subjected to anticoincidence by the fourth semiconductor detection unit 4, and therefore, signals of the recoil protons passing through the fifth semiconductor detection unit 5 and the sixth semiconductor detection unit 6 are only analyzed.

It should be noted that each semiconductor detector in the seven semiconductor detection units works independently and can record the deposition energy spectrum alone. In each semiconductor detection unit, the number of the semiconductor detectors is not limited and may be one, two, three or more, which may be determined according to actual demand. In some embodiments, the semiconductor detectors in each semiconductor detection unit may select silicon detectors.

In some embodiments, with further reference to FIG. 1, the first semiconductor detection unit 1, the fourth semiconductor detection unit 4 and the seventh semiconductor detection unit 7 constitute a first detection group, the second semiconductor detection unit 2 and the sixth semiconductor detection unit 6 constitute a second detection group, the third semiconductor detection unit 3 and the fifth semiconductor detection unit 5 constitute a third detection group, and an area of each semiconductor detection unit in the first detection group is larger than an area of each semiconductor detection unit in the second detection group and the third detection group. The area of each semiconductor detection unit in the first detection group is larger than the area of each semiconductor detection unit in other groups, and thus, the solid angle range within which the charged particle signals are deleted by using an anticoincidence method can be widened.

With further reference to FIG. 1, in some embodiments, the first semiconductor detection unit 1, the fourth semiconductor detection unit 4 and the seventh semiconductor detection unit 7 have the same area and thickness, but they are not limited to be the same as long as it is ensured that the area of each semiconductor detection unit in the first detection group is greater than the area of each semiconductor detection unit in other groups. Furthermore, those skilled in the art can appropriately select the areas and thicknesses of the first semiconductor detection unit 1, the fourth semiconductor detection unit 4 and the seventh semiconductor detection unit 7 according to the spatial size of the detection structure and the processing levels of the semiconductor detectors.

With further reference to FIG. 1, in some embodiments, the second semiconductor detection unit 2 and the sixth semiconductor detection unit 6 in the second detection group have the same area and thickness. It should be noted that those skilled in the art can appropriately select the areas and thicknesses of the second semiconductor detection unit 2 and the sixth semiconductor detection unit 6 according to the spatial size of the detection structure, the processing levels of the semiconductor detectors and the energy range of neutrons to be detected, that is, the areas and thicknesses of the second semiconductor detection unit 2 and the sixth semiconductor detection unit 6 can be selected according to actual demand.

With further reference to FIG. 1, in some embodiments, the third semiconductor detection unit 3 and the fifth semiconductor detection unit 5 in the third detection group have the same area and thickness. It should be noted that those skilled in the art can appropriately select the areas of the third semiconductor detection unit 3 and the fifth semiconductor detection unit 5 according to the spatial size of the detection structure, the processing levels of the semiconductor detectors and the energy range of neutrons to be detected, that is, the areas of the third semiconductor detection unit 3 and the fifth semiconductor detection unit 5 can be selected according to actual demand. Those skilled in the art can appropriately select the thicknesses of the third semiconductor detection unit 3 and the fifth semiconductor detection unit 5 according to the spatial size of the detection structure, the processing levels of the semiconductor detectors, the energy range of neutrons to be detected and the demand on the accuracy of the inversed energy spectrum of neutrons, that is, the thicknesses of the third semiconductor detection unit 3 and the fifth semiconductor detection unit 5 can be selected according to actual demand.

In some embodiments, the area of each semiconductor detection unit in the second detection group is the same as the area of each semiconductor detection unit in the third detection group, that is, the second semiconductor detection unit 2, the sixth semiconductor detection unit 6, the third semiconductor detection unit 3 and the fifth semiconductor detection unit 5 have the same area.

By limiting the above-mentioned areas and thicknesses, as shown in FIG. 1, the detection structure for fast neutrons provided in an embodiment of the present application has a symmetric structure (at the moment, the conversion layer 8 is not taken into account) to the fourth semiconductor detection unit 4, it is more convenient to perform the analysis of the energy spectrum and the analysis accuracy of the energy spectrum is improved.

With further reference to FIG. 1, in some embodiments, the area of the conversion layer 8 is larger than the area of each semiconductor detection unit in the second detection group. It should be noted that the thickness of the conversion layer can be appropriately selected according to demands on the energy and detection efficiency of the neutrons to be detected, that is, the thickness of the conversion layer can be selected according to actual demand. The area of the conversion layer is greater than the area of each semiconductor detection unit in the second detection group, which aims at widening, as much as possible, the solid angle range within which the recoil protons hittable on the fifth semiconductor detection unit 5 are incident.

With further reference to FIG. 1, in some embodiments, the seven semiconductor detection units and the conversion layer 8 are disposed to be coaxial and parallel to each other. It should be noted that the seven semiconductor detection units and the conversion layer can be disposed according to the actual spatial size of the detection structure, and the order of the seven semiconductor detection units is consistent no matter which disposing way is adopted.

Figure 2:
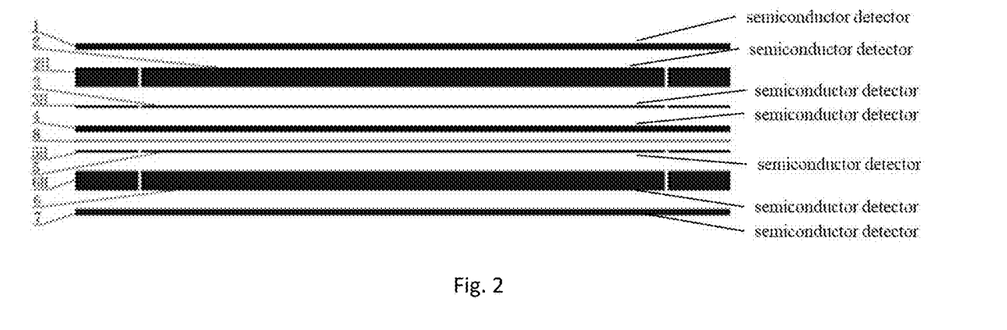
FIG. 2 is a schematic structural diagram showing a detection structure for fast neutrons provided in another embodiment of the present application.

In order to widen the anticoincidence solid angle range of the detection structure to 99%, in some embodiments, with reference to FIG. 2, ring detection units comprise a first ring detection unit 2H, a second ring detection unit 3H, a third ring detection unit 5H and a fourth ring detection unit 6H which are respectively disposed around the second semiconductor detection unit 2, the third semiconductor detection unit 3, the fifth semiconductor detection unit and the sixth semiconductor detection unit 6, each ring detection unit comprises one or more semiconductor detectors, an inner edge of the first ring detection unit 2H disposed around the second semiconductor detection unit 2 is adjacent to an edge of the second semiconductor detection unit 2, an inner edge of the second ring detection unit 3H disposed around the third semiconductor detection unit 3 is adjacent to an edge of the third semiconductor detection unit 3, an inner edge of the third ring detection unit 5H disposed around the fifth semiconductor detection unit 5 is adjacent to an edge of the fifth semiconductor detection unit 5, and an inner edge of the fourth ring detection unit 6H disposed around the sixth semiconductor detection unit 6 is adjacent to an edge of the sixth semiconductor detection unit 6.

Furthermore, it should be noted that, under the condition of anticoincidence, in addition to recoil proton signals generated by elastic scattering of the neutrons and the hydrogen atomic nuclei in the conversion layer, particle signals received by the second semiconductor detection unit and the third semiconductor detection unit are completely consistent with particle signals received by the fifth semiconductor detection unit and the sixth semiconductor detection unit.

By the special structural design, the above-mentioned detection structure for fast neutrons in the present application can effectively reduce influences from interference signals (charged particles and other neutral particles), the energy spectrum of recoil protons is more accurate and the accuracy of the inversed energy spectrum of neutrons is improved.

Figure 3:
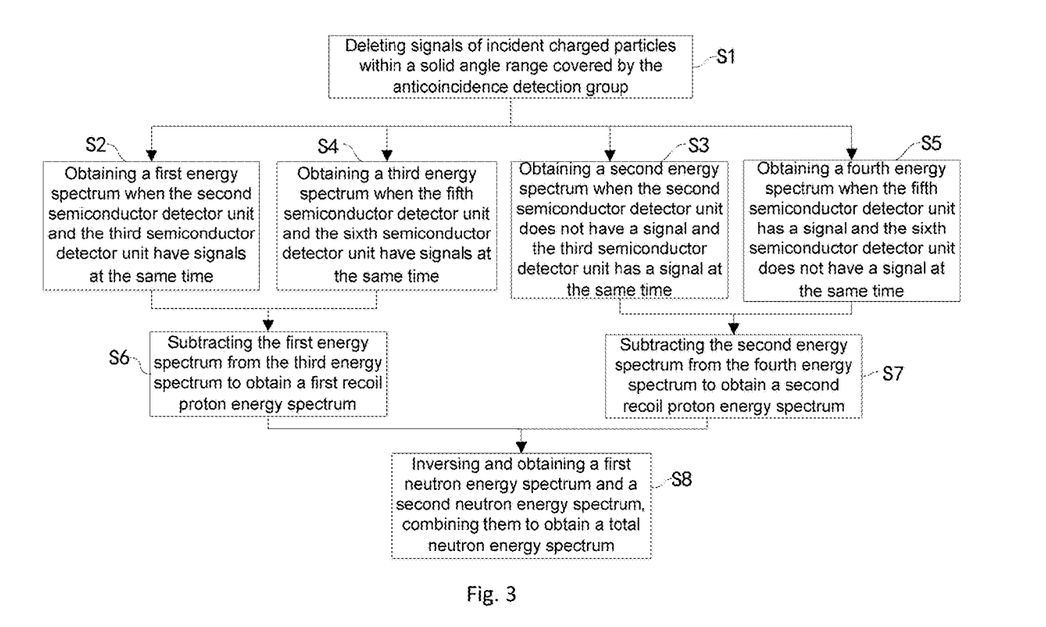
FIG. 3 is a process diagram showing a method for acquiring an energy spectrum of neutrons provided in an embodiment of the present application.

Another embodiment of the present application provides a method for acquiring an energy spectrum of neutrons, adopting the above-mentioned detection structure for fast neutrons, and as shown in FIG. 3, comprising the following steps:

S1, the detection structure for fast neutrons is placed in an isotropic radiation environment (such as a neutron isotropic environment or a proton isotropic environment), and signals of incident charged particles within a solid angle range covered by the first semiconductor detection unit 1, the fourth semiconductor detection unit 4 and the seventh semiconductor detection unit 7 are deleted by an anticoincidence method;

S2, after processing data by the anticoincidence method in S1, when the second semiconductor detection unit 2 and the third semiconductor detection unit 3 have signals at the same time, a first energy spectrum, which is a sum of energy spectra of neutral particle background detected by the second semiconductor detection unit 2 and the third semiconductor detection unit 3, is obtained;

S3, after processing data by the anticoincidence method in S1, when the second semiconductor detection unit 2 does not have a signal and the third semiconductor detection unit 3 has a signal at the same time, a second energy spectrum, which is an energy spectrum of neutral particle background detected by the third semiconductor detection unit 3, is obtained;

S4, after processing data by the anticoincidence method in S1, when the fifth semiconductor detection unit 5 and the sixth semiconductor detection unit 6 have signals at the same time, a third energy spectrum, which is a sum of deposition energy spectra of the fifth semiconductor detection unit 5 and the sixth semiconductor detection unit 6, is obtained, wherein the third energy spectrum comprises energy spectra of recoil protons and neutral particle background detected by the fifth semiconductor detection unit 5 and the sixth semiconductor detection unit 6;

S5, after processing data by the anticoincidence method in S1, when the fifth semiconductor detection unit 5 has a signal and the sixth semiconductor detection unit 6 does not have a signal at the same time, a fourth energy spectrum, which is a deposition energy spectrum detected by the fifth semiconductor detection unit 5, is obtained, wherein the fourth energy spectrum comprises energy spectra of recoil protons and neutral particle background detected by the fifth semiconductor detection unit 5;

S6, a first recoil proton energy spectrum, i.e. a high-energy proton energy spectrum, is obtained by subtracting the first energy spectrum obtained in step S2 from the third energy spectrum obtained in step S4;

S7, a second recoil proton energy spectrum, i.e. a low-energy proton energy spectrum, is obtained by subtracting the second energy spectrum obtained in step S3 from the fourth energy spectrum obtained in step S5; and S8, a first neutron energy spectrum is obtained by inversing the first recoil proton energy spectrum and a second neutron energy spectrum is obtained by inversing the second recoil proton energy spectrum, and a total neutron energy spectrum, which is required to be acquired, is obtained by combining the first neutron energy spectrum and the second neutron energy spectrum.

According to the method for acquiring the neutron energy spectrum provided in the above-mentioned embodiment, the detection structure for fast neutrons is placed in the isotropic radiation environment, firstly, the charged particle signals incident within the solid angle range covered by an anticoincidence detection group is removed by the anticoincidence detection group; next, the first energy spectrum, the second energy spectrum, the third energy spectrum and the fourth energy spectrum are acquired after detection is performed for a period of time, and the energy spectra are subtracted to obtain the high-energy proton energy spectrum and the low-energy proton energy spectrum; and then, reversion is performed to obtain the neutron energy spectrum. By adopting the above-mentioned method provided in the embodiment of the present application, influences from background signals can be effectively reduced, the recoil proton energy spectrum generated by neutrons can be accurately extracted, and the accuracy of the inversed neutron energy spectrum can be improved. Furthermore, it can be understood that the above-mentioned steps S2-S5 may occur simultaneously or occur in a random order, depending on the time when the semiconductor detectors detect corresponding signals.

In some embodiments, when the detection structure for fast neutrons is not provided with the ring detection units, with reference to a structure shown in FIG. 1, the anticoincidence method in the above-mentioned step Si means that if the first semiconductor detection unit 1 or the fourth semiconductor detection unit 4 has a signal at the moment when data in the second semiconductor detection unit 2 and the third semiconductor detection unit 3 is processed, then the data in the second semiconductor detection unit 2 and the third semiconductor detection unit 3 at the moment is deleted; and if the fourth semiconductor detection unit 4 or the seventh semiconductor detection unit 7 has a signal at the moment when data in the fifth semiconductor detection unit 5 and the sixth semiconductor detection unit 6 is processed, then the data in the fifth semiconductor detection unit 5 and the sixth semiconductor detection unit 6 at the moment is deleted. By adopting this anticoincidence method, the charged particle signals incident within a 95% solid angle range can be deleted.

In some other embodiments, when the detection structure for fast neutrons is provided with the ring detection units, with reference to a structure shown in FIG. 2, the anticoincidence method in above-mentioned step S1 means that if the first semiconductor detection unit 1 or the fourth semiconductor detection unit 4 or the first ring detection unit 2H disposed around the second semiconductor detection unit 2 has a signal at the moment when data in the second semiconductor detection unit 2 is processed, then the data in the second semiconductor detection unit 2 at the moment is deleted; if the first semiconductor detection unit 1 or the fourth semiconductor detection unit 4 or the second ring detection unit 3H disposed around the third semiconductor detection unit 3 has a signal at the moment when data in the third semiconductor detection unit 3 is processed, then the data in the third semiconductor detection unit 3 at the moment is deleted; if the fourth semiconductor detection unit 4 or the seventh semiconductor detection unit 7 or the third ring detection unit 5H disposed around the fifth semiconductor detection unit 5 has a signal at the moment when data in the fifth semiconductor detection unit 5 is processed, then the data in the fifth semiconductor detection unit 5 at the moment is deleted; and if the fourth semiconductor detection unit 4 or the seventh semiconductor detection unit 7 or the fourth ring detection unit 6H disposed around the sixth semiconductor detection unit 6 has a signal at the moment when data in the sixth semiconductor detection unit 6 is processed, then the data in the sixth semiconductor detection unit 6 at the moment is deleted. By using this anticoincidence method, the anticoincidence solid angle range of the detection structure can be widened to 99%.

Embodiment 1

Based on above description, in the present embodiment, each of the first semiconductor detection unit 1, the fourth semiconductor detection unit 4 and the seventh semiconductor detection unit 7 adopted a circular silicon detector of which the thickness was 300 µm and the diameter was 35 mm; each of the second semiconductor detection unit 2 and the sixth semiconductor detection unit 6 adopted a circular silicon detector of which the thickness was 1 mm and the diameter was 28 mm; each of the third semiconductor detection unit 3 and the fifth semiconductor detection unit 5 adopted a silicon detector of which the thickness was 100 µm and the diameter was 28 mm; furthermore, a ring detection unit was disposed around each of the second semiconductor detection unit 2, the third semiconductor detection unit 3, the fifth semiconductor detection unit 5 and the sixth semiconductor detection unit 6; the first ring detection unit 2H disposed around the second semiconductor detection unit 2 adopted an ring silicon detector of which the thickness was 1 mm, the internal diameter was 29 mm and the external diameter was 35 mm; the second ring detection unit 3H disposed around the third semiconductor detection unit 3 adopted an ring silicon detector of which the thickness was 100 µm, the internal diameter was 29 mm and the external diameter was 35 mm; the third ring detection unit 5H disposed around the fifth semiconductor detection unit 5 adopted an ring silicon detector of which the thickness was 100 µm, the internal diameter was 29 mm and the external diameter was 35 mm; the fourth ring detection unit 6H disposed around the sixth semiconductor detection unit 6 adopted an ring silicon detector of which the thickness was 1 mm, the internal diameter was 29 mm and the external diameter was 35 mm; and the conversion layer adopted a high-density polyethylene sheet of which the thickness was 100 µm and the diameter was 35 mm.

It is relatively difficult to acquire isotropic neutrons and charged particles with specific energy distribution in actual experiments, therefore, the isotropic neutrons and charged particles with specific energy distribution were simulated below by using Geant4 (Agostinelli S, Allison J, Amako K, et al., "GEANT4—A simulation toolkit", Nuclear Instruments and Methods in Physics Research, Section A: Accelerators, Spectrometers, Detectors and Associated Equipment, 2003, 506(3): 250-303, the content of which is herewith incorporated by reference in its entirety; Allison J, Amako K, Apostolakis J, et al., "Geant4 developments and applications", IEEE Transactions on Nuclear Science, 2006, 53(1): 270-278, the content of which is herewith incorporated by reference in its entirety) simulation software, and then, neutrons were detected by adopting the detection structure for fast neutrons and the method for acquiring the neutron energy spectrum in the present embodiment, to verify the effectiveness of the detection structure for fast neutrons and the method provided in the present application.

Figure 4:
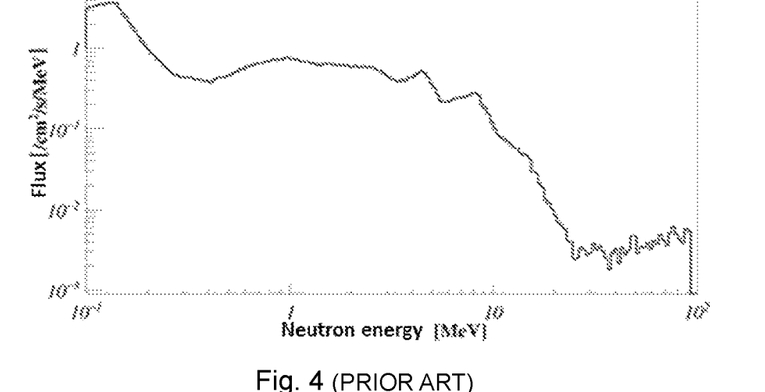
FIG. 4 shows an energy spectrum of neutrons of an earth orbit in literature.
Figure 5:
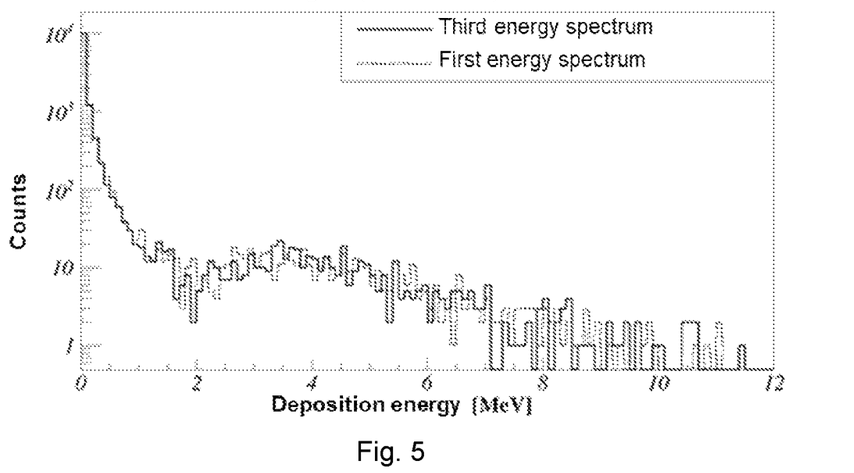
FIG. 5 shows a comparison result of a third energy spectrum and a first energy spectrum when $10^9$ neutrons of which the energy ranges from 0.1 MeV to 100 MeV and the energy distribution is based on the distribution of the energy spectrum of neutrons of the earth orbit in FIG. 4 are isotropically incident under the condition that a conversion layer is removed in an embodiment of the present application.
Figure 6:
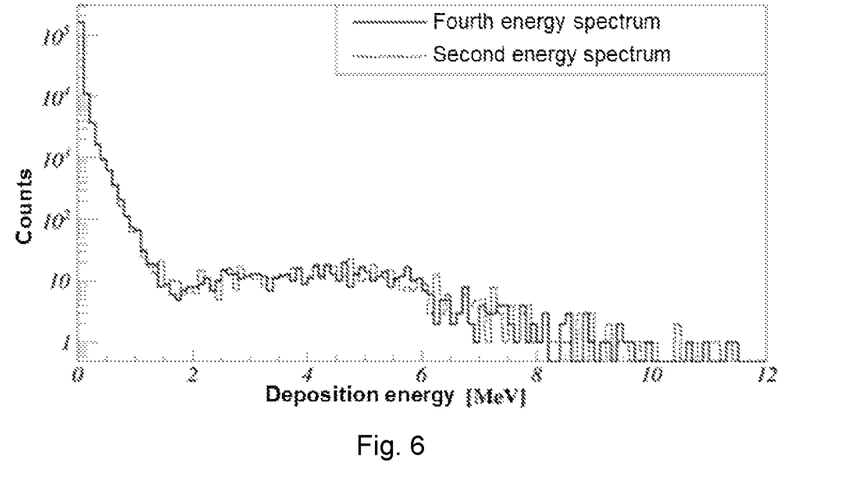
FIG. 6 shows a comparison result of a fourth energy spectrum and a second energy spectrum when $10^9$ neutrons of which the energy ranges from 0.1 MeV to 100 MeV and the energy distribution is based on the distribution of the energy spectrum of neutrons of the earth orbit in FIG. 4 are isotropically incident under the condition that a conversion layer is removed in an embodiment of the present application.

Under the condition that the conversion layer was removed, $10^9$ neutrons of which the energy ranged from 0.1 MeV to 100 MeV and the energy was distributed according to a neutron energy spectrum (with reference to FIG. 4) of an earth orbit in literature (Koshiishi H, Matsumoto H, Chishiki A, et al., "Evaluation of the neutron radiation environment inside the International Space Station based on the Bonner Ball Neutron Detector experiment", Radiation Measurements, 2007, 42(9): 1510-1520, the content of which is herewith incorporated by reference in its entirety) were isotropically incident to obtain a comparison result (with reference to FIG. 5) of the third energy spectrum and the first energy spectrum and a comparison result (with reference to FIG. 6) of the fourth energy spectrum and the second energy spectrum. Within the allowable error range, the third energy spectrum was consistent with the first energy spectrum, and the fourth energy spectrum was consistent with the second energy spectrum.

Figure 7:
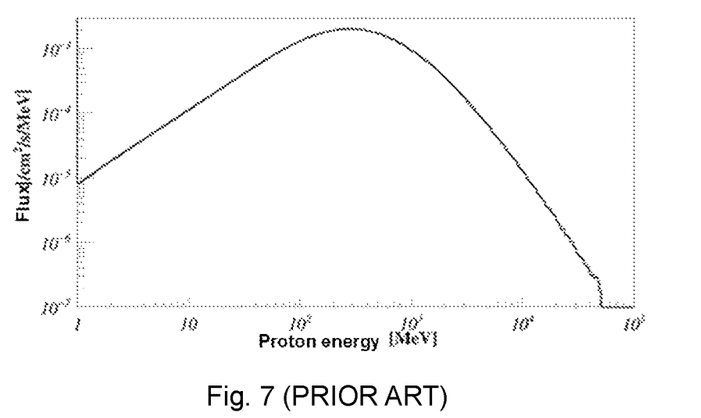
FIG. 7 shows a proton energy spectrum in a cosmic ray energy spectrum model in literature.
Figure 8:
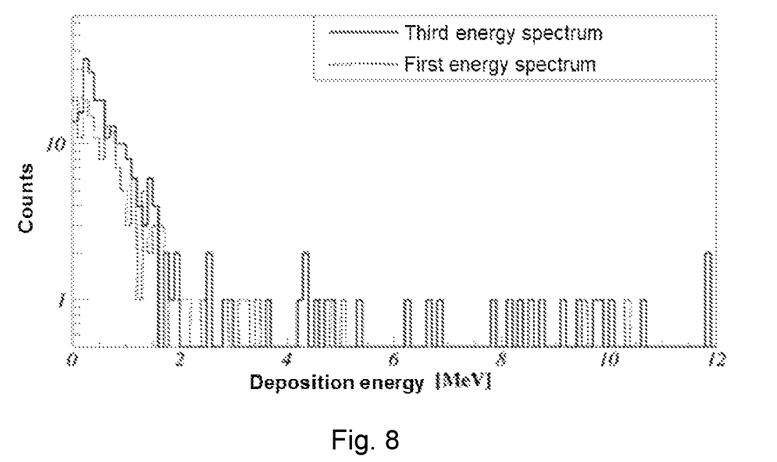
FIG. 8 shows a comparison result of a third energy spectrum and a first energy spectrum when $10^9$ protons of which the energy ranges from 1 MeV to $5\times10^4$ MeV and the energy distribution is based on the distribution of the cosmic ray energy spectrum model in FIG. 7 are isotropically incident under the condition that a conversion layer is removed in an embodiment of the present application.
Figure 9:
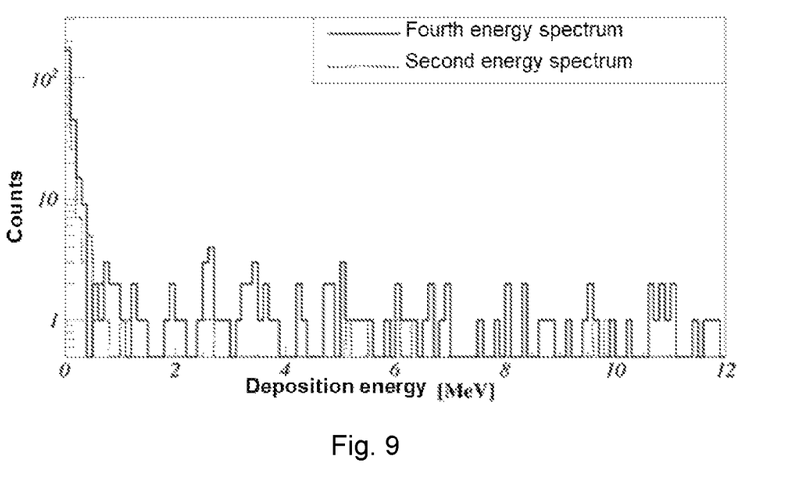
FIG. 9 shows a comparison result of a fourth energy spectrum and a second energy spectrum when $10^9$ protons of which the energy ranges from 1 MeV to $5\times10^4$ MeV and the energy distribution is based on the distribution of the cosmic ray energy spectrum model in FIG. 7 are isotropically incident under the condition that a conversion layer is removed in an embodiment of the present application.

Under the condition that the conversion layer was removed, $10^9$ protons of which the energy ranged from 1 MeV to $5\times10^4$ MeV and the energy was distributed according to a proton energy spectrum (with reference to FIG. 7) in a cosmic ray energy spectrum model in literature (O'Neill, P. M., Golge, S., Slaba, T. C., "Badhwar—O'Neill 2014 galactic cosmic ray flux model description", NASA Technical Paper 2015-218569; 2015, the content of which is herewith incorporated by reference in its entirety) were isotropically incident to obtain a comparison result (with reference to FIG. 8) of the third energy spectrum and the first energy spectrum and a comparison result (with reference to FIG. 9) of the fourth energy spectrum and the second energy spectrum. Within the allowable error range, the third energy spectrum was consistent with the first energy spectrum, and the fourth energy spectrum was consistent with the second energy spectrum.

It can be seen from the above-mentioned experiment that, when recoil protons were not generated, particle signals received by the second semiconductor detection unit and the third semiconductor detection unit were completely consistent with particle signals received by the fifth semiconductor detection unit and the sixth semiconductor detection unit. After the conversion layer was disposed, the detection structure for fast neutrons in the present application can effectively reduce influences from the background signal and accurately extract a recoil proton energy spectrum generated by neutrons.

Figure 10:
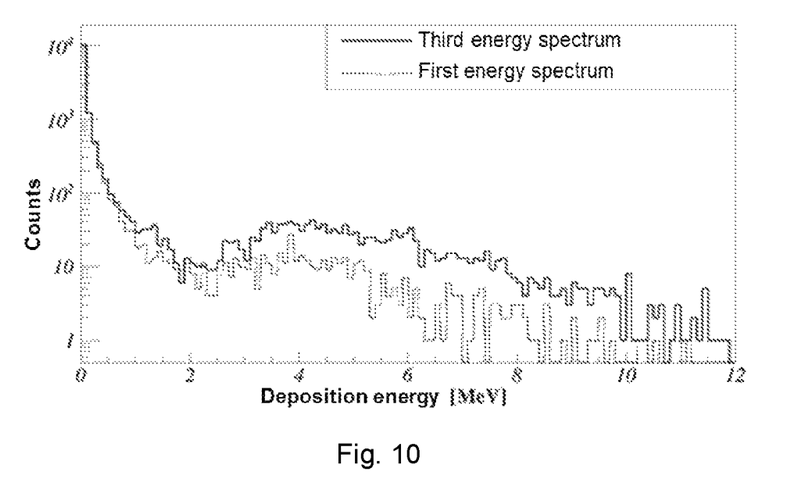
FIG. 10 shows a comparison result of a third energy spectrum and a first energy spectrum when $10^9$ neutrons of which the energy ranges from 0.1 MeV to 100 MeV and the energy distribution is based on the distribution of the energy spectrum of neutrons of the earth orbit in FIG. 4 are isotropically incident in an embodiment of the present application.
Figure 11:
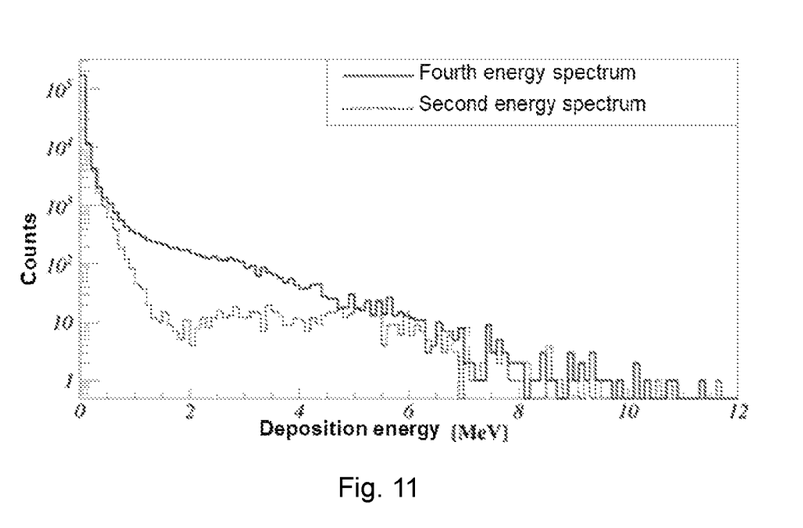
FIG. 11 shows a comparison result of a fourth energy spectrum and a second energy spectrum when $10^9$ neutrons of which the energy ranges from 0.1 MeV to 100 MeV and the energy distribution is based on the distribution of the energy spectrum of neutrons of the earth orbit in FIG. 4 are isotropically incident in an embodiment of the present application.
Figure 12:
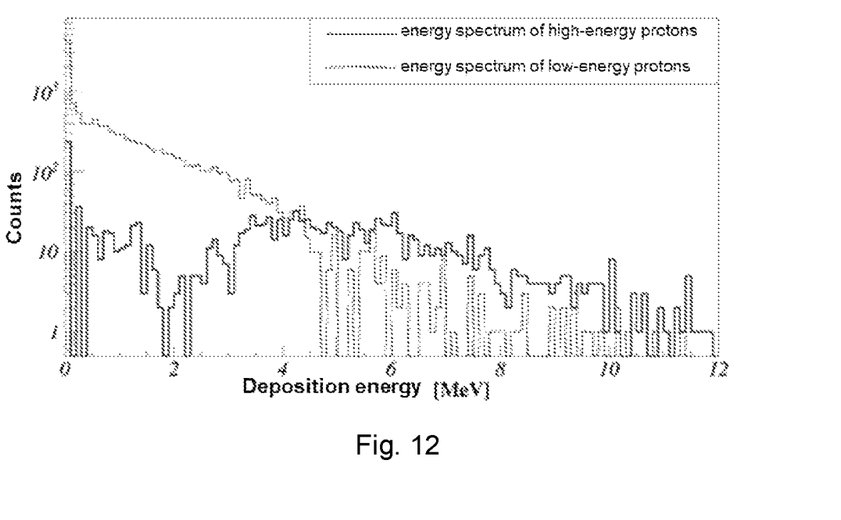
FIG. 12 shows a first recoil proton energy spectrum and a second recoil proton energy spectrum obtained when $10^9$ neutrons of which the energy ranges from 0.1 MeV to 100 MeV and the energy distribution is based on the distribution of the energy spectrum of neutrons of the earth orbit in FIG. 4 are isotropically incident in an embodiment of the present application.

When the conversion layer 8 was disposed, $10^9$ neutrons of which the energy ranged from 0.1 MeV to 100 MeV and the energy was distributed according to a neutron energy spectrum (with reference to FIG. 4) of an earth orbit in literature (Koshiishi H, Matsumoto H, Chishiki A, et al., "Evaluation of the neutron radiation environment inside the International Space Station based on the Bonner Ball Neutron Detector experiment", Radiation Measurements, 2007, 42(9): 1510-1520) were isotropically incident to obtain a comparison result (with reference to FIG. 10) of the third energy spectrum and the first energy spectrum and a comparison result (with reference to FIG. 11) of the fourth energy spectrum and the second energy spectrum. It can be seen from FIG. 10 and FIG. 11, the third energy spectrum was obviously different from the first energy spectrum, and the fourth energy spectrum was also obviously different from the second energy spectrum. The first energy spectrum was subtracted from the third energy spectrum to obtain the first recoil proton energy spectrum (i.e. high-energy protons), and the second energy spectrum was subtracted from the fourth energy spectrum to obtain the second recoil proton energy spectrum (i.e. low-energy protons), with reference to FIG. 12.

Figure 13:
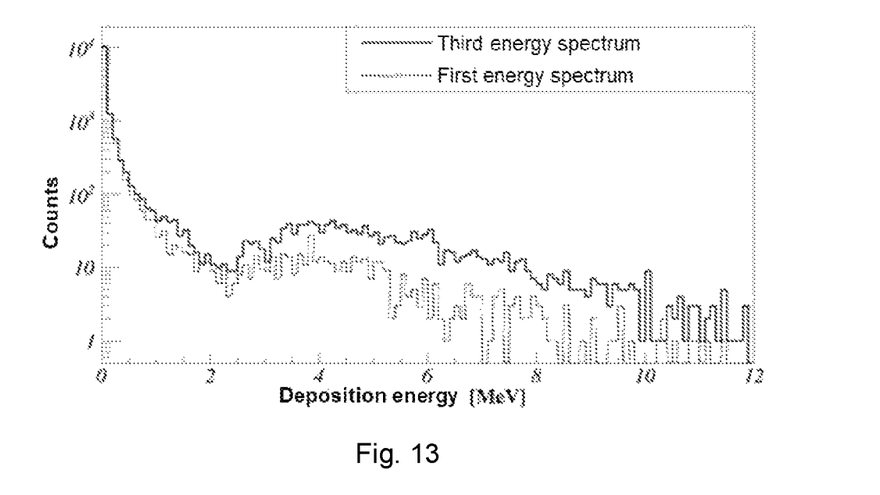
FIG. 13 shows a comparison result of a third energy spectrum and a first energy spectrum when $2\times10^9$ protons of which the energy ranges from 1 MeV to $5\times10^4$ MeV and $10^9$ neutrons of which the energy ranges from 0.1 MeV to 100 MeV are isotropically incident according to a ratio of a flux of protons in cosmic rays to a flux of neutrons in an earth orbit in an embodiment of the present application, wherein the protons are distributed according to the proton energy spectrum of the cosmic ray energy spectrum model in FIG. 7, and the neutrons are distributed according to the energy spectrum of neutrons of the earth orbit in FIG. 4.
Figure 14:
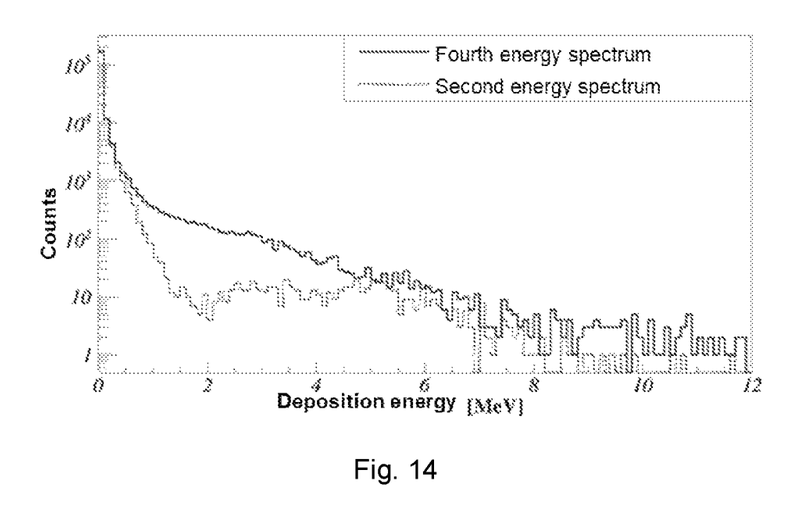
FIG. 14 shows a comparison result of a fourth energy spectrum and a second energy spectrum when $2\times10^9$ protons of which the energy ranges from 1 MeV to $5\times10^4$ MeV and $10^9$ neutrons of which the energy ranges from 0.1 MeV to 100 MeV are isotropically incident according to a ratio of a flux of protons in cosmic rays to a flux of neutrons in an earth orbit in an embodiment of the present application, wherein the protons are distributed according to the proton energy spectrum of the cosmic ray energy spectrum model in FIG. 7, and the neutrons are distributed according to the energy spectrum of neutrons of the earth orbit in FIG. 4.
Figure 15:
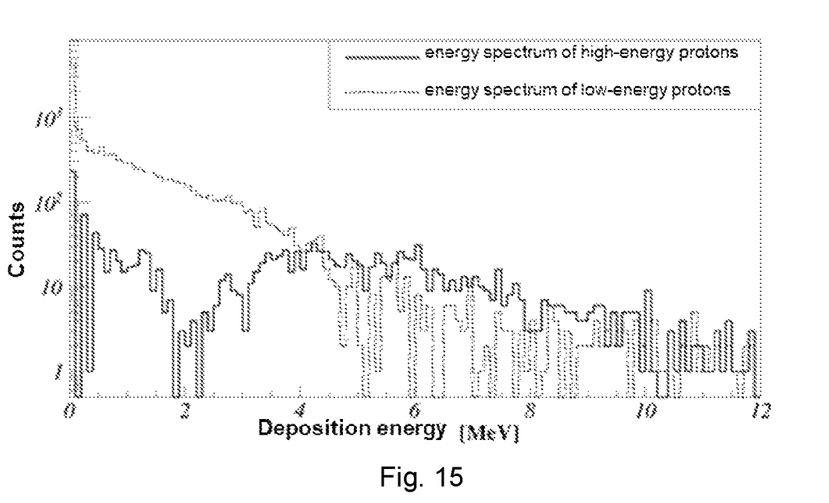
FIG. 15 shows a first recoil proton energy spectrum (i.e. high-energy protons) and a second recoil proton energy spectrum (i.e. low-energy protons) obtained when $2\times10^9$ protons of which the energy ranges from 1 MeV to $5\times10^4$ MeV and $10^9$ neutrons of which the energy ranges from 0.1 MeV to 100 MeV are isotropically incident according to a ratio of a flux of protons in cosmic rays to a flux of neutrons in an earth orbit in an embodiment of the present application, wherein the protons are distributed according to the proton energy spectrum of the cosmic ray energy spectrum model in FIG. 7, and the neutrons are distributed according to the energy spectrum of neutrons of the earth orbit in FIG. 4.

When the conversion layer 8 was disposed, a radiation environment in a near-earth orbit space was simulated, $2\times10^9$ protons of which the energy ranged from 1 MeV to $5\times10^4$ MeV and $10^9$ neutrons of which the energy ranged from 0.1 MeV to 100 MeV were isotropically incident according to a ratio of a flux of protons in cosmic rays to a flux of neutrons in an earth orbit to obtain a comparison result (with reference to FIG. 13) of the third energy spectrum and the first energy spectrum and a comparison result (with reference to FIG. 14) of the fourth energy spectrum and the second energy spectrum, wherein the energy spectrum of the protons was distributed according to a proton energy spectrum (with reference to FIG. 7) in a cosmic ray energy spectrum model in literature (O'Neill, P. M., Golge, S., Slaba, T. C., "Badhwar—O'Neill 2014 galactic cosmic ray flux model description", NASA Technical Paper 2015-218569; 2015), and the energy spectrum of the neutrons was distributed according to an energy spectrum of neutrons (with reference to FIG. 4) of an earth orbit in literature (Koshiishi H, Matsumoto H, Chishiki A, et al., "Evaluation of the neutron radiation environment inside the International Space Station based on the Bonner Ball Neutron Detector experiment", Radiation Measurements, 2007, 42(9): 1510-1520). It can be seen from FIG. 13 and FIG. 14, the third energy spectrum was obviously different from the first energy spectrum, and the fourth energy spectrum was also obviously different from the second energy spectrum. The first energy spectrum was subtracted from the third energy spectrum to obtain the first recoil proton energy spectrum (i.e. high-energy protons), and the second energy spectrum was subtracted from the fourth energy spectrum to obtain the second recoil proton energy spectrum (i.e. low-energy protons), with reference to FIG. 15.

The first recoil proton energy spectrum was inversed to obtain the first neutron energy spectrum and the second recoil proton energy spectrum was inversed to obtain the second neutron energy spectrum, and the two neutron energy spectra were combined to obtain the total neutron energy spectrum, which was required to be acquired.

The above-mentioned embodiments are intended to explain the present application, rather than to limit the present application. Any modifications and variations made on the present application within the spirit of the present application and the protection scope of the claims shall fall into the protection scope of the present application.

The invention claimed is:

1. A detection structure for fast neutrons, comprising:
seven semiconductor detection units which are arranged sequentially as a first semiconductor detection unit, a second semiconductor detection unit, a third semiconductor detection unit, a fourth semiconductor detection unit, a fifth semiconductor detection unit, a sixth semiconductor detection unit and a seventh semiconductor detection unit, each semiconductor detection unit comprises at least one semiconductor detector; the first semiconductor detection unit, the fourth semiconductor detection unit and the seventh semiconductor detection unit constitute an anticoincidence detection group which is used to delete charged particle signals incident within a solid angle range covered by the anticoincidence detection group; the second semiconductor detection unit and the third semiconductor detection unit constitute a neutral particle background detection group which is used to measure an energy spectrum of neutral particle background generated in semiconductor detectors by neutral particles, wherein the neutral particles comprise neutrons and gamma rays;
the fifth semiconductor detection unit and the sixth semiconductor detection unit constitute a recoil proton detection group which is used to measure a deposition energy spectrum generated in the semiconductor detectors by recoil protons; and
a conversion layer made of a hydrogen-containing material is disposed between the fourth semiconductor detection unit and the fifth semiconductor detection unit, incident fast neutrons collision with hydrogen atomic nuclei in the conversion layer and generate the recoil protons, then the recoil protons pass through the fifth semiconductor detection unit and the sixth semiconductor detection unit to obtain the deposition energy spectrum.

2. The detection structure for fast neutrons according to claim 1, wherein, the first semiconductor detection unit, the fourth semiconductor detection unit and the seventh semiconductor detection unit constitute a first detection group, the second semiconductor detection unit and the sixth semiconductor detection unit constitute a second detection group, the third semiconductor detection unit and the fifth semiconductor detection unit constitute a third detection group, and an area of each semiconductor detection unit in the first detection group is larger than an area of each semiconductor detection unit in the second detection group and the third detection group.

3. The detection structure for fast neutrons according to claim 2, wherein the first semiconductor detection unit, the fourth semiconductor detection unit and the seventh semiconductor detection unit in the first detection group have the same area and thickness.

4. The detection structure for fast neutrons according to claim 2, wherein the second semiconductor detection unit and the sixth semiconductor detection unit in the second detection group have the same area and thickness.

5. The detection structure for fast neutrons according to claim 2, wherein the third semiconductor detection unit and the fifth semiconductor detection unit in the third detection group have the same area and thickness.

6. The detection structure for fast neutrons according to claim 1, wherein, ring detection units comprise a first ring detection unit, a second ring detection unit, a third ring detection unit and a fourth ring detection unit which are respectively disposed around the second semiconductor detection unit, the third semiconductor detection unit, the fifth semiconductor detection unit and the sixth semiconductor detection unit, each ring detection unit comprises at least one semiconductor detector, an inner edge of the first ring detection unit disposed around the second semiconductor detection unit is adjacent to an edge of the second semiconductor detection unit, an inner edge of the second ring detection unit disposed around the third semiconductor detection unit is adjacent to an edge of the third semiconductor detection unit, an inner edge of the third ring detection unit disposed around the fifth semiconductor detection unit is adjacent to an edge of the fifth semiconductor detection unit, and an inner edge of the fourth ring detection unit disposed around the sixth semiconductor detection unit is adjacent to an edge of the sixth semiconductor detection unit.

7. The detection structure for fast neutrons according to claim 1, wherein, the seven semiconductor detection units and the conversion layer are disposed to be coaxial and parallel to each other.

8. A method for acquiring a neutron energy spectrum, adopting the detection structure for fast neutrons according to claim 1, comprising the following steps:
placing the detection structure for fast neutrons in an isotropic radiation environment, and deleting signals of incident charged particles within a solid angle range covered by the first semiconductor detection unit, the fourth semiconductor detection unit and the seventh semiconductor detection unit by an anticoincidence method;
after processing data by the anticoincidence method, when the second semiconductor detection unit and the third semiconductor detection unit have signals at the same time, obtaining a first energy spectrum which is a sum of energy spectra of neutral particle background detected by the second semiconductor detection unit and the third semiconductor detection unit;
after processing data by the anticoincidence method, when the second semiconductor detection unit does not have a signal and the third semiconductor detection unit has a signal at the same time, obtaining a second energy spectrum which is an energy spectrum of neutral particle background detected by the third semiconductor detection unit;
after processing data by the anticoincidence method, when the fifth semiconductor detection unit and the sixth semiconductor detection unit have signals at the same time, obtaining a third energy spectrum which is a sum of deposition energy spectra detected by the fifth semiconductor detection unit and the sixth semiconductor detection unit, wherein the third energy spectrum comprises energy spectra of recoil protons and neutral particle background detected by the fifth semiconductor detection unit and the sixth semiconductor detection unit;
after processing data by the anticoincidence method, when the fifth semiconductor detection unit has a signal and the sixth semiconductor detection unit does not have a signal at the same time, obtaining a fourth energy spectrum which is a deposition energy spectrum detected by the fifth semiconductor detection unit, wherein the fourth energy spectrum comprises energy spectra of recoil protons and neutral particle background detected by the fifth semiconductor detection unit;
subtracting the first energy spectrum from the third energy spectrum to obtain a first recoil proton energy spectrum;

subtracting the second energy spectrum from the fourth energy spectrum to obtain a second recoil proton energy spectrum; and inversing the first recoil proton energy spectrum to obtain a first neutron energy spectrum and inversing the second recoil proton energy spectrum to obtain a second neutron energy spectrum, and combining the first neutron energy spectrum and the second neutron energy spectrum to obtain a total neutron energy spectrum which is required to be acquired.

9. The method for acquiring the energy spectrum of neutrons according to claim 8, wherein the anticoincidence method means that if the first semiconductor detection unit or the fourth semiconductor detection unit has a signal at a moment when data in the second semiconductor detection unit and the third semiconductor detection unit is processed, then the data in the second semiconductor detection unit and the third semiconductor detection unit at the moment is deleted; and if the fourth semiconductor detection unit or the seventh semiconductor detection unit has a signal at a moment when data in the fifth semiconductor detection unit and the sixth semiconductor detection unit is processed, then the data in the fifth semiconductor detection unit and the sixth semiconductor detection unit at the moment is deleted.

10. The method for acquiring the energy spectrum of neutrons according to claim 8, wherein in the detection structure for fast neutrons, ring detection units comprise a first ring detection unit, a second ring detection unit, a third ring detection unit and a fourth ring detection unit which are respectively disposed around the second semiconductor detection unit, the third semiconductor detection unit, the fifth semiconductor detection unit and the sixth semiconductor detection unit, each ring detection unit comprises at least one semiconductor detector, an inner edge of the first ring detection unit disposed around the second semiconductor detection unit is adjacent to an edge of the second semiconductor detection unit, an inner edge of the second ring detection unit disposed around the third semiconductor detection unit is adjacent to an edge of the third semiconductor detection unit, an inner edge of the third ring detection unit disposed around the fifth semiconductor detection unit is adjacent to an edge of the fifth semiconductor detection unit, and an inner edge of the fourth ring detection unit disposed around the sixth semiconductor detection unit is adjacent to an edge of the sixth semiconductor detection unit;

wherein the anticoincidence method means that if the first semiconductor detection unit or the fourth semiconductor detection unit or the first ring detection unit disposed around the second semiconductor detection unit has a signal at a moment when data in the second semiconductor detection unit is processed, then the data in the second semiconductor detection unit at the moment is deleted; if the first semiconductor detection unit or the fourth semiconductor detection unit or the second ring detection unit disposed around the third semiconductor detection unit has a signal at a moment when data in the third semiconductor detection unit is processed, then the data in the third semiconductor detection unit at the moment is deleted; if the fourth semiconductor detection unit or the seventh semiconductor detection unit or the third ring detection unit disposed around the fifth semiconductor detection unit has a signal at a moment when data in the fifth semiconductor detection unit is processed, then the data in the fifth semiconductor detection unit at the moment is deleted; and if the fourth semiconductor detection unit or the seventh semiconductor detection unit or the fourth ring detection unit disposed around the sixth semiconductor detection unit has a signal at a moment when data in the sixth semiconductor detection unit is processed, then the data in the sixth semiconductor detection unit at the moment is deleted.

* * * * *